United States Patent [19]

Melchior et al.

[11] 4,078,387
[45] Mar. 14, 1978

[54] POWER UNITS COMPRISING A SUPERCHARGED INTERNAL COMBUSTION ENGINE

[75] Inventors: Jean Melchior, Neuilly-sur-Seine; Thierry Andre; Michel de Lambert de Boisjean, both of Paris, all of France

[73] Assignee: Etat Francais, Paris, France

[21] Appl. No.: 679,631

[22] Filed: Apr. 23, 1976

[30] Foreign Application Priority Data

Apr. 24, 1975   France ............................. 75 12743

[51] Int. Cl.² ...................... F02B 33/40; F02B 33/44
[52] U.S. Cl. ........................................ 60/606; 60/611
[58] Field of Search ............... 60/599, 600, 601, 605, 60/606, 611, 602, 603

[56] References Cited

U.S. PATENT DOCUMENTS

| | | | |
|---|---|---|---|
| 2,633,698 | 4/1953 | Nettel | 60/599 |
| 3,096,615 | 7/1963 | Zuhn | 60/606 |
| 3,423,927 | 1/1969 | Scherenberg | 60/606 |
| 3,541,784 | 11/1970 | Haase | 60/605 |
| 3,651,636 | 3/1972 | Glassey et al. | 60/611 |
| 3,949,555 | 4/1976 | Melchior | 60/606 |
| 3,988,894 | 11/1976 | Melchior | 60/606 |

Primary Examiner—William L. Freeh
Assistant Examiner—L. J. Casaregola
Attorney, Agent, or Firm—Barnes, Kisselle, Raisch & Choate

[57] ABSTRACT

A power unit comprises a Diesel engine supercharged by a turbocompressor which has a turbine receiving the engine exhaust gases. A by-pass pipe conveys the air not absorbed by the engine from the compressor to the turbine with a pressure drop which is independent of the flow rate and increases with the compressor outlet pressure. An auxiliary combustion chamber upstream of the turbine receives the air which has travelled through the by-pass. A throttle is disposed in the path of the supercharging air to the engine and is automatically actuated so as to maintain the flow rate of air absorbed by the engine at a value below the flow rate supplied by the compressor under low load conditions.

18 Claims, 4 Drawing Figures

POWER UNITS COMPRISING A SUPERCHARGED INTERNAL COMBUSTION ENGINE

BACKGROUND AND SUMMARY OF THE INVENTION

The invention relates to power units comprising an internal combustion engine having variable-volume combustion chambers supercharged by a turbocompressor having a turbine which receives the engine exhaust gases and comprising by-pass pipe means which may be permanently open during operation of the engine, designed to convey the air not drawn by the engine from the compressor to the turbine with a pressure drop which, if appreciable, is substantially independent of the flow rate and increases with the compressor outlet pressure. An auxiliary combustion chamber is disposed upstream of the turbine and receives at least part of the air which has travelled through the by-pass pipe.

The invention applies to engines, having rotors as well as to an engine having reciprocating pistons, and to engines ignited by sparking as well as by compression. It is specially advantageous, however, in the case of an installation comprising a motor constituting a displacement machine (i.e., more particularly a four-stroke engine as opposed to a two-stroke engine). In this case also, the invention is of particular advantage in the case of power units comprising a four-stroke engine having a low volumetric ratio (below 12 and even possibly below 6), supercharged by a turbine-compressor unit whose compressor has a high compression ratio (up to 6 or even more) and operating near its surge line so that its efficiency is also high.

The term "turbocompressor" or "turbine-compressor unit" is to be construed as covering the case where there are a number of turbine units and/or stages or where there are a number of compressor units, the air being cooled if required between successive compressor units.

In the power units of the aforementioned kind which is described in French Patent Specification 2,179,310 and in the corresponding U.S. Pat. No. 3,988,894 the by-pass pipe is provided with throttle means which subject the air flowing from the compressor to the turbine to a pressure drop which is substantially independent of the flow rate and increases in linear proportion with the compressor outlet pressure (and usually represents 5 to 15% of the last-mentioned pressure). The by-pass pipe enables the turbocompressor to operate like a gas turbine with high efficiency, near its surge line.

On the other hand, some of these power units have a limitation.

The supercharging turbocompressor is selected to match the engine when the latter operates at the rated point, i.e., at maximum power (maximum torque and maximum speed). The matching is generally such that, at the rated point, the compressor supplies the flow rate of air drawn by the engine plus an additional 5 or 15% of the flow rate taken in by the engine, the additional flow being used for:

Maintaining an air flow in the by-pass pipe so as to maintain the pressure difference between the compressor and the turbine, And/or supplying the oxygen needed for a pilot burner in the auxiliary combustion chamber, if such a chamber is provided, And/or feeding circuits for cooling hot engine components (e.g. the exhaust manifold, the spark-plugs if any, etc.), And/or supplying reserve air for covering variations in the ambient conditions or progressive clogging of the air filters in use.

For decreasing the manufacture and operation costs, the compressor is typically selected to meet but not to exceed the aforementioned requirements.

If now the air intaken by the engine is at a substantially constant temperature, the line representing engine operation at constant speed (the flow-rate/pressure characteristic) is approximately a straight line passing through the origin, at least in the case of a four-stroke engine constituting a volumetric machine. On the other hand, the operating point of the turbocompressor moves along a curve which is concave towards the pressure axis and which extends through (a) a rated matching point corresponding to the rated pressure and a flow rate between 5 and 15% higher than that taken by the engine and (b) a point representing a zero flow rate for a pressure ratio equal to unity.

Consequently, the two characteristics inevitably intersect, whatever the engine speed (the only effect of which is a decrease in the slope of the engine flow-rate/pressure characteristic when the engine speed is lower).

If the pressure ratio is allowed to drop to and below the point of intersection, the air flow in the branch pipe will first stop and then reverse, thus preventing normal operation of the engine and, more particularly, any acceleration without load, as we shall see hereinafter.

One obvious method of overcoming the difficulty would be to inject fuel into the auxiliary combustion chamber at a rate controlled by regulating means preventing the supercharging pressure from falling below a value slightly above that corresponding to the intersection of the curves. In most engines, however, this method is unsatisfactory since it substantially increases the total fuel consumption when the engine is idling or under low load.

It is an object of the invention to provide an improved power unit of the above-mentioned type, wherein the aforementioned disadvantage is at least partially overcome.

It is another object of the invention to take advantage of the fact that in power units as disclosed in the aforesaid U.S. Pat. No. 3,988,894 the pressure difference upstream and downstream of the by-pass pipe is independent of the flow rate through the branch pipe (the difference being the same as between the compressor outlet and the turbine inlet) so as to solve a problem which is common to all supercharged engines having a low compression ratio and is rendered more acute if the intake is throttled; and which consists in starting and operating the engine under idling and low-power conditions when the ambient temperature is very low.

According to an aspect of the invention, there is provided an internal combustion engine having variable volume combustion chambers, a supercharging turbocompressor unit having a compressor and a turbine, the inlet of said turbine being connected to receive the exhaust gas of said engine, pipe means connecting the outlet of the compressor to the intake of the engine, by-pass conduit means having an inlet and an outlet connected to flow the air delivered by said compressor and not drawn by the engine to the inlet of said turbine with a pressure loss which is substantially independent of the ratio of the flow rate traversing said by-pass conduit means to the air flow delivered by the compressor and increases with the output pressure of the compressor, an auxiliary combustion chamber connected to receive at least part of the air which circulates along said by-pass conduit means and the exhaust gas of said engine and having an output connected to the inlet of said turbine, adjustable air flow throttling means diposed in said pipe means downstream of the junction of said bypass conduit means with said pipe means, control means having means responsive to the load of the power unit and operatively associated with said throttling means for limiting the rate of air flow taken by the engine when the unit delivers a low amount of power and maintaining said rate of air flow at a value lower than the air flow delivered by the compressor.

Advantageously the automatic actuating means are responsive to engine operating parameters so as to maintain a constriction such that the flow rate through the by-pass pipe is sufficient to establish a well-defined pressure difference between the turbine inlet and the compressor outlet and to provide the oxygen necessary for fuel burning in the auxiliary chamber, and also so as to ensure that the engine exhaust temperature does not exceed a permissible limit.

The power unit preferably comprises recycling pipe means communicating with the output of the auxiliary combustion chamber and with the intake of said engine and non-return valve means in said pipe means which open when the pressure in the intake is lower than the pressure at the output of the auxiliary combustion chamber for recycling combustion gas from said output to said intake.

Thus, the engine intakes a fraction of its exhaust gases and of the combustion gases from the auxiliary chamber together with the air required for fuel combustion during start-up at low temperature.

Supercharged Diesel engines provided with a throttle valve at the engine intake are known (U.S. Pat. No. 2,633,698 Nettel). In these engines, however, the throttle valve fulfills a completely different purpose from that contemplated by the invention, and does not give the same result. More specifically, the only purpose of the valve in such prior art engines is to render starting the engine at low ambient temperature easier; when the flow of air from the compressor is stopped by throttling the valve, the air is heated by compression before it enters the engine (e.g., see col. 1, lines 52–55, and col. 2, lines 1–6).

In such prior art supercharged Diesel engines, a pipe can also be provide for recycling exhaust gases, in which case the pipe must be provided with a throttle valve for adjusting the ratio between the exhaust-gas flow rate and the rate of air arriving through a wide open duct. The throttle valve is usually manually controlled and it can be only very approximately adjusted. Starting at very low temperature remains difficult, either because too much exhaust gas is recycled so that combustion becomes incomplete and the engine may choke and stall, or because not enough is recycled, thus preventing starting. Furthermore, the throttle valve is immersed in high-temperature gases and therefore rapidly deteriorates.

It should be noted that the invention does not consist simply in changing the position of a throttle valve disposed downstream of the compressor so as to facilitate starting of supercharged engines in accordance with a prior-art feature, for the same purpose as in the case of an engine according to French specification 2,179,310. The invention consists in a combination of throttle means and means for controlling them and which come into action when the engine is idling or slightly loaded so as to fulfil a function which was not described (and had no reason to be described) in the prior art.

A fundamental difference between the results sought by the two methods is also clear from the fact that, apparently, the only result of a prior art valve is in a power unit comprising a permanently open pipe is to aggravate the problem which the valve is intended to solve in U.S. Pat. No. 2,633,698, i.e., when the load is low, the throttle means tend to direct air down the by-pass pipe.

In the power unit according to the invention, the difficulty is overcome by combining a by-pass pipe producing a well-defined pressure drop and wide-open recycling means, so as directly to regulate, not the ratio of the two flow rates, but the flow rate of air to the engine, which is maintained at a value such that there is no exhaust overload. In the by-pass pipe there are two pressure levels which may be called "upstream" and "downstream" and are both determined by the upstream pressure only. When the throttle means at the engine intake provide an air flow cross-sectional area which is insufficient for the intake manifold pressure to be greater than the downstream level, recycling occurs and restores the downstream level such that a hot atmosphere, at the same pressure as downstream of the engine, prevails in the intake manifold. Since the "downstream" pressure level is not influenced by the extent to which the throttle means are opened, the flow rate of fresh air to the engine is dependent only on the flow cross-sectional area provided by the throttle means. Thus, the cross-sectional area can be adjusted to fulfil a given condition, e.g. maintaining the engine intake temperature at a constant value, without a complete feed back loop.

The recycling means are typically arranged to recycle the engine exhaust gases and gases from the auxiliary chamber to the intake. Then the regulating means can be simplified and the gases taken at the auxiliary chamber outlet contain little or no unburnt hydrocarbons, unlike the exhaust gases. Finally, the combustion gases are much hotter, and can therefore be recycled at smaller mass flow rates.

The recycling means can consist of a pipe having a large cross-section (so as not to produce an appreciable pressure drop) and provided with non-return means (e.g. a check valve having a light spring basing it toward its seat). In that case, the system for regulating the throttle means can be designed to operate only when the engine load falls below a value which is just above the value at which the auxiliary chamber comes into action so as to maintain the compressor outlet pressure at a threshold level necessary for self ignition of the engine.

SHORT DESCRIPTION OF THE DRAWINGS

The invention will be better understood from the following description of a power unit constituting an embodiment given by way of example. The description refers to the accompanying drawings in which.

Figure 1:
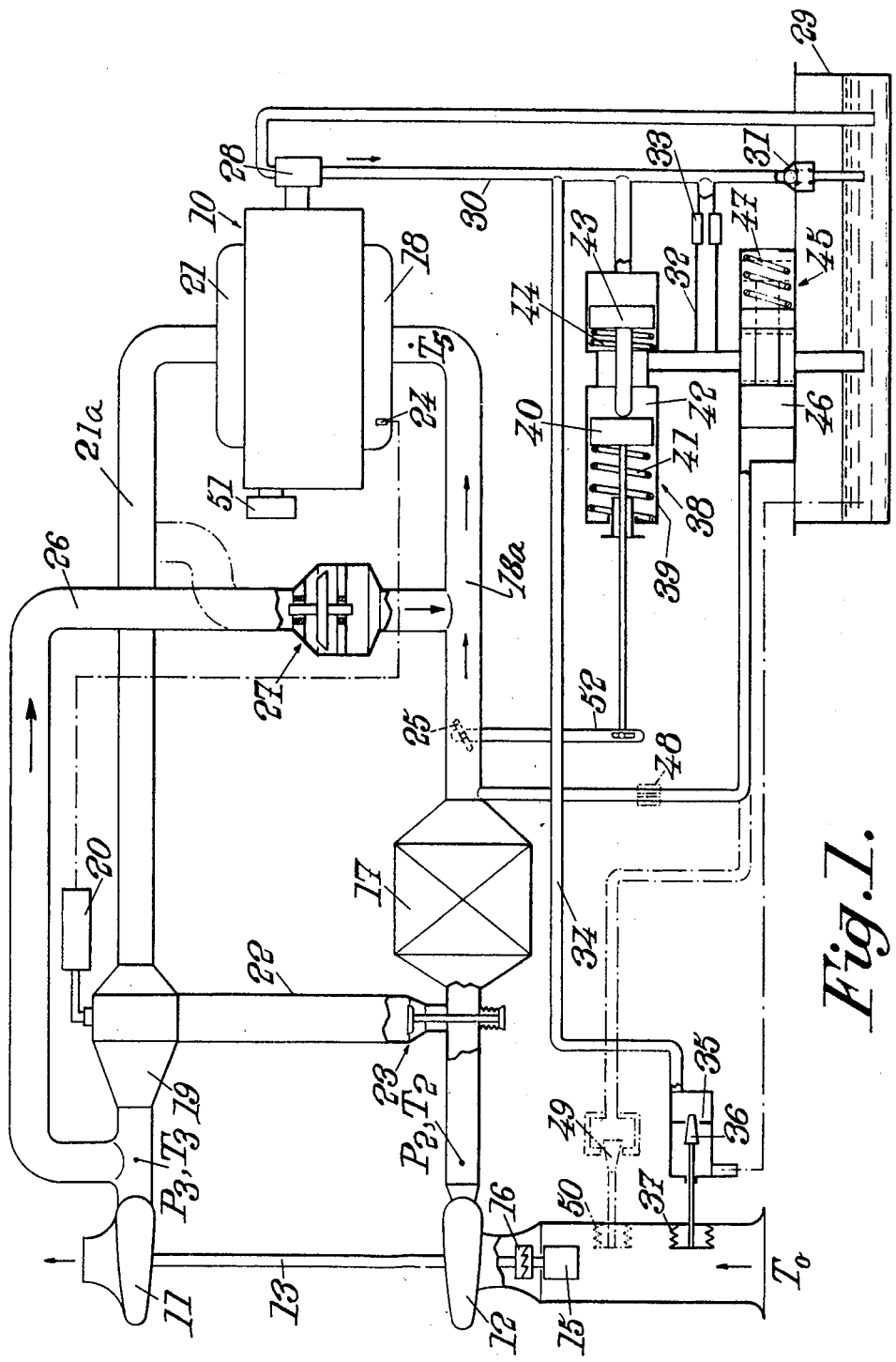
FIG. 1 is a simplified diagram of the power unit, which comprises a hydromechanical system for actuating the throttle means.
Figure 3:
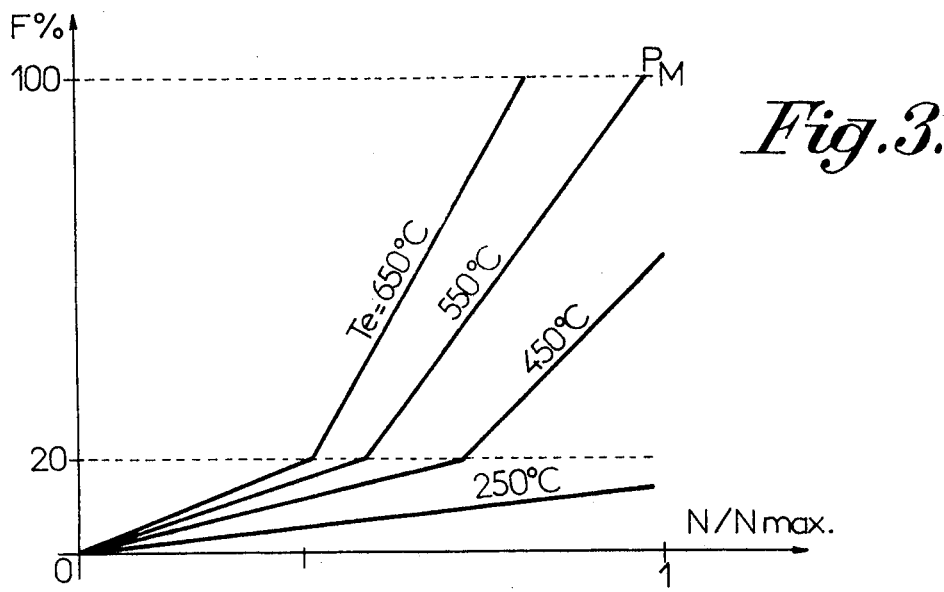
Figure 4:
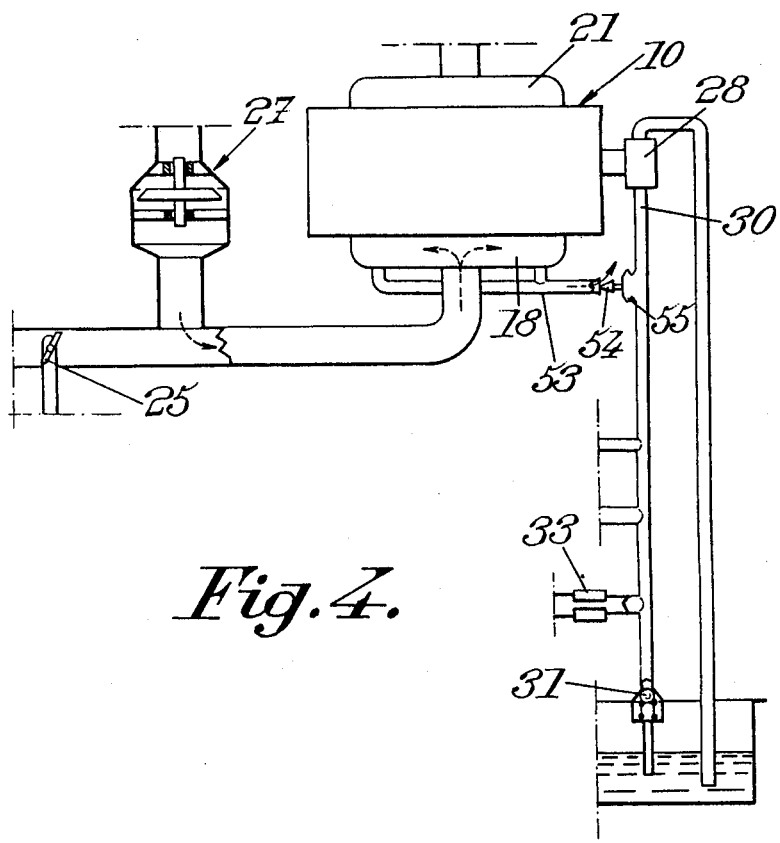

FIG. 3 includes curves showing the variation in power in an engine for use in the power unit in FIG. 1, in dependence on its speed rpm for various exhaust temperatures Te, up to a maximum permissible value which is 650° C; and FIG. 4 diagrammatically shows a modified embodiment.

DESCRIPTION OF A PREFERRED EMBODIMENT

Referring to FIG. 1, there is shown a power unit comprising an engine 10, hereinafter assumed to be a four-stroke Diesel engine having a low volumetric ratio (less than 12and a supercharging turbocompressor unit comprising a turbine 11 and compressor 12 whose rotors are connected by shaft 13. An electric cranking motor 15 coupled to the shaft by a clutch 16 is mounted in the air intake of compressor 12, which is of centrifugal type. Compressor 12 has a high compression ratio, typically greater than 6. Ratios of this magnitude can be obtained with existing single-stage supersonic compressors. An air cooler 17 provided with means (not shown) for putting it out of operation is disposed in the air path provided by the connecting pipe 18a running between the air compressor 12 and the engine intake manifold 18. An auxiliary combustion chamber 19 provided with a fuel supply 20 can reheat the gases coming from the exhaust manifold 21 via engine exhaust pipe 21a before they enter turbine 11, when the energy contained in the exhaust gases is insufficient.

A by-pass pipe 22, permanently open, in operation supplies the turbine with whatever air is provided by compressor 12 and not taken by engine 10. Pipe 22 connects to pipe 18a at the upstream end of cooler 17 and rims to the auxiliary combustion chamber 19. Pipe 22 contains a throttle device 23 which subjects the air travelling through pipe 22 to chamber 19 to a pressure drop $\Delta P = P_2 - P_3$ which increases substantially in proportion with the compressor outlet pressure $P_2$ and which is independent of the flow rate through the pipe. Device 23 may inter alia be as described in French Patent Specification 2,179,310 or the corresponding U.S. Pat. No. 3,988,894.

Figure 2:
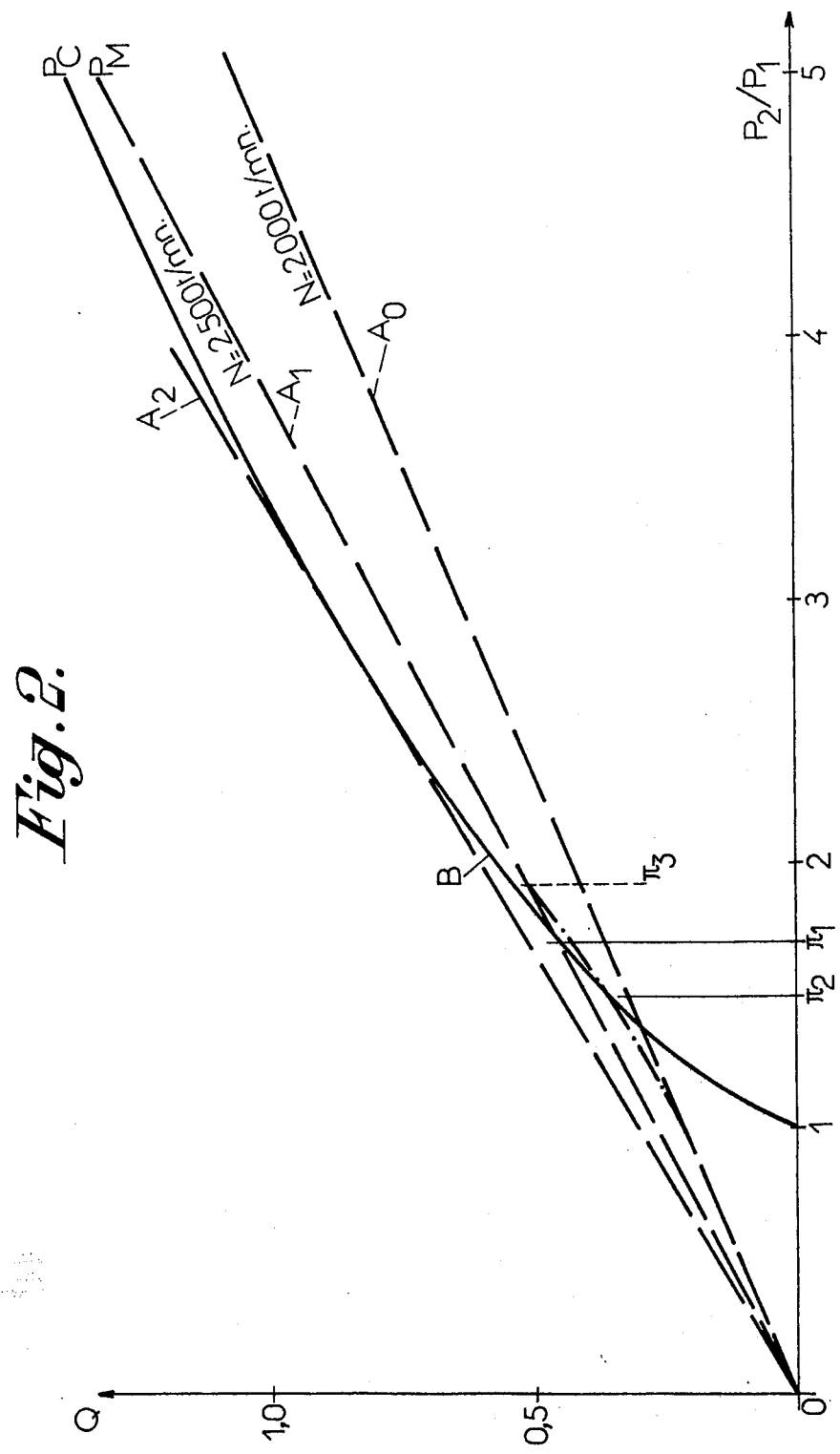
FIG. 2 shows the flow-rate pressure characteristics of an engine and a turbocompressor which can be included in the power unit of FIG. 1.

With reference to FIG. 2, the problem of operating the power unit at low pressures and low surpercharging flow rates, will be described along with the solution provided by the invention.

Since engine 10 is a volumetric machine and, via cooler 17, receives air which is usually at an almost constant temperature (approx. 100° C), its characteristic (the variation in the mass flow rate of intaken air Q in dependence on the relative supercharging pressure $P_2/P_1$) at a constant speed N is substantially a straight line passing through the original and having a slope which decreases with the speed. For example, the characteristics $A_0$, $A_1$ and $A_2$ of a typical 800 hp diesel V8 engine at N = 2000 rpm, N = 2500 rpm and N = 2,800 rpm overspeed are shown in chain lines on FIG. 2; curve $A_1$ extends through the rated point $P_M$.

Since, owing to the permanently open branch pipe 22, the turbocompressor operates as a gas turbine, the compressor 12 has a single characteristic curve B passing through the point corresponding to $P_2/P_1 = 1$ ($P_1$ denoting atmospheric pressure) and Q = 0 (Q denoting the mass flow rate of the compressor). The characteristic (B) is a concave line, an example of which is given in FIG. 2. Its exact shape depends on the cross sectional area offered by the nozzles of the turbine and there is no simple way of modifying it for a particular turbocompressor in operation. If compressor 12 is to be satisfactory matched to engine 10, the rated point $P_C$ of the compressor generally corresponds to a flow rate between 5 and 15% higher than the flow rate corresponding to the rated point $P_M$ of the engine.

As can be seen, curve B inevitably passes below curve A near the origin (for a value $\pi_1 = 1.7$ of $P_1/P_2$ at 2500 rpm in the case illustrated) and operation below thie point is impossible since it would result in a reverse flow in pipe 22 and the extinction of chamber 19. A pressure drop $\Delta P$ proportional to $P_2 - P_3$ would not be obtained any longer. If the injection of fuel into the auxilary chamber is simply controlled by device 20 so as to maintain the pressure in manifold 18 (detected by a pick-up 24) at a sufficient level for self-ignition, and if this level corresponds to a value $\pi_2 P_2/P_1$ below $\pi_1$, it can be seen that it is impossible to accelerate under no load conditions up to the rated speed. If, for example $\pi_2 = 1.5$ (as illustrated in FIG. 2) it is impossible to accelerate under no load up to 2000 rpm, to say nothing of higher speeds; the auxiliary chamber will be extinguished before 2000 rpm, owing to lack of air, and since the turbocompressor cannot operate only on the low-temperature exhaust gases from engine 10, the engine also will stall.

This situation is liable to occur and produce faulty operation during double declutching on a vehicle or when coating as well as if a ship's propeller gets out of water or is subject to cavitation.

A simple remedy is to increase the threshold value for it to be greater than $\pi_1$, but this considerably increases the consumption under partial load and during idling. Another solution is to provide a compressor which, at the rated point $P_C$, gives a much higher flow rate than required by the engine; in this case matching is poor, since the flow rate along pipe 22 will be too high, at least under partial load, and the engine exhaust gases will be cooled by dilution, necessitating either increased heating in chamber 19 (i.e., an increase in total fuel consumption) or an increase in the engine exhaust temperature and consequent thermal overloading.

The power unit of FIG. 1 comprises means which obviate the last-mentioned fault without increasing fuel consumption during idling and under low load, and retaining satisfactory compressor engine matching. For that purpose, there are provided:

Means 25 for throttling the flow of air to engine 10, the means being represented in FIG. 1 by a butterfly valve which can be replaced by any other means which is not subjected to subtantial pressure forces tending to open or close it; and A system for automatically actuating means 25, which maintains means 25 fully open when the engine load is greater than a given fraction (e.g. 20%) of its rated load and, below this threshold, partially closes means 25 so as to limit the air flow to motor 10 to a value which is sufficiently low for the flow rate in pipe 22 to enable chamber 19 to operate and sufficiently high for the temperature of a critical component of engine 10 (usualy the exhaust temperature) not to exceed a given limiting value.

This limitation has no disadvantage for the engine. In the absence of means 25, the engine is under low power and takes in much more air than is needed for fuel combustion, and the exhaust temperature is much lower than the maximum permitted temperature. At a given power, the exhaust temperature is a very rapidly decreasing function of the speed N (the air/fuel ratio increasing substantially in proportion to N). This property is shown in FIG. 3, which shows the variation, at a predetermined exhaust temperature $T_e$, of the fraction F of the rated power of a typical engine in dependence on the speed N, referred to the rated speed N max., for an installation having an auxiliary combustion chamber 19 which comes into operation when F is less than 20%, so as to maintain $P_2/P_1$ at the value $\pi_1$ and ensure self-ignition. It can be seen that, at low load and high engine speed, the operating conditions are still such that the exhaust temperature $T_e$ is low and can be increased by intake throttling without risk of overheating.

Consequently, the automatic actuating means can be very simple; it can be limited e.g. to an element for moving means 25 associated with a temperaure pick-up disposed on the exhaust manifold and a circuit which operates the element so as to maintain the gas outlet temperature at a value which is either constant or dependant on $N/N_m$ as long as F does not exceed 20%. Whatever method of actuation is used, the result is to modify the engine characteristics at a constant speed. By way of example, the chain-dotted line in FIG. 2 shows the modification of characteristic $A_1$, the lower part of which has the same characteristic as $A_O$ and thus intersects curve B below $\pi_1$.

However, the auxiliary combustion chamber cannot operate if the engine is allowed to operate at overspeed (from 2800 rpm) irrespective of the engine load (since curve $A_2$ is above curve B). Consequently, a device for relighting the auxiliary chamber should be provided, or no load overspeed operation should be prevented.

In the embodiment shown in FIG. 1, means 25 and their actuating system are associated with a hot-gas recycling pipe 26 which, when means 25 are put into operation, re-establishes the downstream pressure $P_3$ at the engine inlet by supplying hot gases from the outlet of the auxiliary combustion chamber 19. Pipe 26 connects the downstream end of chamber 19, which is at pressure $P_3$, to the engine intake manifold 18. Pipe 26 contains a non-return check valve 27 which closes the pipe during the time when fresh air after travelling through means 25 is intaken by the engine at a pressure higher than $P_3$.

Since $\Delta P = P_2 - P_3$ is dependent only on $P_2$, the flow rate of air through means 25 is dependent entirely on the flow cross-section offered by means 25. Accordingly, an examination of the operation of the engine shows that the system for regulating means 25 can be very simple, like the system shown in FIG. 1.

During low-power operation (when $P_2$ corresponds a fraction F which is less than 20% in the case illustrated in FIG. 3), the air cooler 17 being inoperative, the auxiliary combustion chamber 19 operating and butterfly valve 25 being partly closed, there is the following approximate relation between the temperature $T_5$ at which the air-exhaust gas mixture enters the engine, the compressor outlet temperature $T_2$, the recycled gas temperature $T_3$, the sucked in air flow-rate $q_a$ and the total flow rate $q_m$ taken in by the engine;

$$T_5 = (q_a/q_m) T_2 + (1 - q_a/q_m) T_3.$$

Assuming that the pressure drop $\Delta P = P_3 - P_2$ produced by means 23 is proportional to $P_2$, and that $T_2$ and $T_3$ depend only on $P_2$ (i.e., the compressor has a single characteristic line) a simple calculation shows that $T_5$ remains substantially constant (at a given ambient temperature) if the cross-sectional area S provided by the throttle means 25 is proportional to the engine speed N, provided the auxiliary combustion chamber operates so as to maintain $P_2$ at the bottom value.

Under these conditions, a constant intake temperature during the operating periods at which chamber 19 intervenes to maintain the bottom level $\pi_2$, can be maintained simply by actuating the means 25 so that S is proportional to N.

The system in FIG. 1 comprises an automatic regulating device which is designed to fulfil the last-mentioned condition and to take account of changes in ambient temperature, which result in proportional changes of temperature $T_3$ (for a given value of $\pi_2$) and the intake temperature, as long as cooler 17 is inoperative. As will be seen, the compensation is produced by modifying the proportionality ratio between the cross-section and the speed of rotation.

The actuating system can be regarded as comprising:

A source of oil or any other hydraulic fluid at a pressure proportional to the square of the engine rotation speed N;

An actuator operatively associated to the throttle means 25; and

A switching or distributor valve 45, which is sensitive to the pressure $P_2$ upstream of the throttle means and applies the oil pressure to the actuator, either completely or after reduction, depending on the pressure $P_2$.

Oil under pressure is supplied by an oil pump 28 driven by engine 10 and supplying a flow rate $Q_h$ proportional to the speed N;

$$Q_h = k_1 N$$

The pump draws oil from a tank 29 and delivers it to a pipe system 30 comprising a calibrated valve 31, the only purpose of which is to protect the hydraulic circuit. The pump delivery pressure $P_h$ is adjusted by one or more leak circuits containing restricted nozzle means having a cross-section which is fixed or dependent on that operating parameter, which is to be taken into consideration.

In the embodiment illustrated, two leak circuits are provided in parallel flow relation.

The first circuit comprises a duct 32 leading back to the dump tank 29 and comprising a nozzle 33 having a fixed cross-section $s_1$, and The second circuit comprises a duct 34 leading back to the tank and comprising a nozzle 35 having a flow cross-section $s_2$ dependent on the position of a needle 36 carried by a temperature sensitive capsule 37 subjected to ambient temperature $T_O$.

Thus, when the first circuit is open, the pressure $P_h$ in pipe 30 is:

$$P_h = k_2 N^2 / (s_1 + s_2)^2$$

$k_2$ is being a constant.

If pressure $P_h$ can reach 50 bars at the rated speed, valve 31 will e.g. be calibrated at 60 bars.

The actuator is a two-stage hydraulic jack 38 comprising a cylinder 39 and two pistons axially movable in the cylinder, namely:

A main piston 40 having a rod connected to a lever secured to the butterfly valve 25, one surface of which is subjected to atmospheric pressure $P_O$ and the other surface of which is subjected to the pressure $P^*_h$ in a relay chamber 42, whose action is opposed by that of a return spring 41; and A control piston 43 which is urged in a direction away from piston 40 by the pressure $P^*_h$ in chamber 42 and a calibrated return spring 44, and is urged in the other direction by the delivery pressure $P_h$ of pump 28.

Last, the switching valve 45, by "on-off" operation gives the following values to $P^*_h$:

The value $P_O$ when the supercharging ratio $P_2/P_0$ is less than a predetermined value ($\pi_3$ on FIG. 2) thus actuating butterfly valve 25 via piston 43 (in which case piston 40 is substantially pressure balanced); and the value $P_h$ when $P_2/P_0$ is greater than the threshold value, $\pi_3$, thus moving piston 42 to its limit position (towards the left in FIG. 1) corresponding to full opening of butterfly valve 25.

Switching valve 45 comprises a casing disposed in duct 32 downstream of the place where chamber 42 is connected, and contains a slide valve 46 which is acted upon in one direction by a force exerted by pressure $P_2$ and in the other direction by a calibrated spring 47.

Spring 47 is calibrated so that, when $P_2/P_0$ is less than $\pi_3$, slide valve 46 occupies a position (full lines in FIG. 1) in which it connects duct 32 with the discharge tank) whereas when $P_2/P_0$ exceeds this value, valve 46 shuts off the connection (the position shown in broken lines).

If the ambient temperature $T_0$ can vary within wide limits, $\pi_3$ should preferably be given a value which increases when $T_0$ decreases. For this purpose, as indicated by broken lines in FIG. 1, it is sufficient to pick-up the pressure acting on valve 46 at a point in leak duct to atmosphere from the intake of engine 10, that point being located between a nozzle 48 having a constant cross-section and a nozzle having a cross-section controlled by a needle 49 of suitable profile, borne by a thermometer capsule 50.

The operation of the power unit will be briefly described, assuming that the pressure value $\pi_3$ is not adjusted in dependence on the ambient temperature $T_0$, but the pressure $P_h$ is adjusted in dependence on temperature $T_0$.

For simplicity, we shall assume that the turbocompressor is first started up and then brought to the operating rotating speed, using cranking motor 15 and auxiliary chamber 19. Pressure $P_h$ is then zero and the supercharging pressure is low. Springs 41, 44 return pistons 40, 43 to their abutment position (towards the right in FIG. 1) which is selected so as to correspond to complete closure of butterfly valve 25. Slide valve 46 connects the relay chamber 42 to the tank 29.

Next, the cranking motor 51 of engine 10 is actuated. As long as the engine operates with the starter in operation, its speed is low (less than 250 rpm for a rated speed of e.g. 2500 rpm). Pressure $P_h$ remains below the value (e.g. 0.5 bar) at which piston 43 begins to move after overcoming the force of spring 44 ($P^*_h$ remaining equal to $P_0$).

Under these conditions, engine 10 starts by directly intaking the gases supplied by combustion chamber 19, which receives an excess of air which is quite sufficient to burn the fuel injected into the engine. After the motor has started, but is still under idling or low-load conditions, and until the value $\pi_3$ of $P_2/P_0$ is reached and causes valve 45 to switch over, actuator 38 progressively opens the butterfly valve 25 so that the air flow cross-section (and consequently the air flow rate) is substantially proportional to the speed N, the proportionality coefficient depending on $T_0$.

To this end, it is sufficient if the cross-section of valve 25 and the cross-section of the pipe section in which the valve moves are such that the flow cross-section varies in proportion to the square root of the travel of piston 40 from the completely-closed position.

Finally, after passing the value $\pi_3$ (which is advantageously slightly greater than the value for which the auxiliary chamber 19 is cut off), the slide valve 46 moves into the position shown by broken lines in FIG. 2, and $P^*_h$ becomes equal to $P_h$ (which simultaneously increases owing to the elimination of a leakage path).

When the power unit is designed so that the turbocompressor starts and operates independently on the auxiliary combustion chamber before the engine is cranked, the power-unit is advantageously designed so that at least certain parts of the engine can be pre-heated by the combustion chamber gases, thus facilitating starting of the engine.

In the embodiment shown in FIG. 4 (where compnents already shown in FIG. 1 bear like reference numbers), the result is obtained by producing a temporary leak from the intake manifold 18 to atmosphere. The leak path comprises one or more small-diameter ducts 53, which have a valve where they open to atmosphere. In the embodiment shown, the valve is a needle valve 54 carried by a capsule 55 subjected to the delivery pressure of pump 28 and thus closing automatically as soon as the engine starts. Alternatively the valve may be manually controlled.

It can be seen that as soon as the turbo-compressor starts, while the throttle 25 is closed, a small flow of hot gases (at approx. 500° C) from the auxiliary combustion chamber enters the intake manifold and then escapes to atmosphere, after passing and heating the metal components along a track indicated by chain-line arrows in FIG. 4. Consequently, the engine may be started easily and quickly.

The preceding description relates to a power-unit comprising starting means for starting the turbo-compressor unit before the engine. Of course, the last-mentioned means are in no way indispensable and are only one possibility of starting the engine, for which the present invention is particularly suitable. Although the invention facilitates starting of the engine, it can equally well be used in power-units where the engine is started by any other means.

We claim:

1. A power unit comprising:
    an internal combustion engine having variable volume combustion chambers,
    a supercharging turbocompressor unit having a compressor and a turbine, the inlet of said turbine being connected to receive the exhaust gas of said engine,
    pipe means connecting the outlet of the compressor to the intake of the engine,
    bypass conduit means having an inlet and an outlet always connected and open during operation of said turbocompressor unit to flow the air delivered by said compressor and not drawn by the engine to the inlet of said turbine and first throttle means operable therein to produce a pressure loss which is substantially independent of the ratio of the flow rate traversing said bypass conduit means to the air flow delivered by the compressor and which increases with the output pressure of the compressor,
an auxiliary combustion chamber connected to receive at least part of the air which circulates along said bypass conduit means and the exhaust gas of said engine and having an output connected to the inlet of said turbine,
adjustable air flow second throttling means disposed in said pipe means downstream of the junction of said bypass conduit means with said pipe means,
and control means having means responsive to the load of the power unit and operatively associated with said second throttling means for limiting the rate of air flow taken by the engine directly from said compressor when said power unit delivers a low amount of power and maintaining said rate of air flow at a value lower than the air flow delivered by the compressor whereby the balance is diverted into said bypass conduit means.

2. A power unit according to claim 1, further comprising recycling pipe means communicating with the output of the auxiliary combustion chamber and with the intake of said engine and non-return valve means in said pipe means which opens when the pressure in the intake is lower than the pressure at the output of the auxiliary combustion chamber for recycling combustion gas from said output to said intake.

3. A power unit according to claim 2, wherein said recycling pipe means are of sufficient cross-sectional area for circulating the maximum flow rate drawn by the engine without impressing a substantial head loss thereto.

4. A power unit comprising:
an internal combustion engine having variable volume combustion chambers;
a supercharging turbocompressor unit having a compressor and a turbine, the inlet of said turbine being connected to receive the exhaust gas of said engine,
pipe means connecting the outlet of the compressor to the intake of the engine,
bypass conduit means having an inlet and an outlet always connected and open during operation of said turbocompressor unit to flow the air delivered by said compressor and not drawn by the engine to the inlet of said turbine and first throttle means operable therein to produce a pressure loss which is substantially independent of the ratio of the flow rate traversing said bypass conduit means to the air flow delivered by the compressor and which increases with the output pressure of the compressor,
an auxiliary combustion chamber connected to receive at least part of the air which circulates along said bypass conduit means and the exhaust gas of said engine and having an output connected to the inlet of said turbine,
second throttle means with a variable passage cross section and arranged so as to be traversed by the air flowing through said pipe means and disposed therein downstream of the junction of said bypass conduit means with said pipe means,
control means responsive to the speed of said engine and operatively connected to said second throttling means for increasing said passage cross section in proportion as the speed of said engine increases,
and means responsive to the pressure in said intake for overriding said control means and for maintaining said second throttle means in fully open condition as long as the pressure in said intake exceeds a predetermined value.

5. A power unit according to claim 4, having means for sensing the ambient temperature and for adjusting said predetermined value responsive to the variations of said ambient temperature.

6. A power unit according to claim 4, wherein said auxiliary combustion chamber is provided with control means operated in response to the pressure delivered by the compressor for preventing the compressor pressure from decreasing under a predetermined threshold value which is lower than said predetermined value.

7. A power unit according to claim 4, further comprising means for adjusting the coefficient of proportionality between said speed and said cross-section as a function of the ambient temperature.

8. A power unit according to claim 1, further comprising a leak path from the intake of the engine to atmosphere, closure means for maintaining said leak path in open condition as long as said engine is at rest whereby hot gas can flow from said auxiliary combustion chamber to flow to atmosphere and sweep said intake prior to cranking of the engine.

9. A power unit according to claim 4 further comprising a leak path from the intake of the engine to atmosphere, closure means for maintaining said leak path in open condition as long as said engine is at rest whereby hot gas can flow from said auxiliary combustion chamber to flow to atmosphere and sweep said intake prior to cranking of the engine.

10. A power unit according to claim 3 wherein said second throttle means is disposed between the junction of said bypass conduit means with said pipe means and the junction of said recycling pipe means with said pipe means.

11. A power unit according to claim 4 further comprising recycling pipe means communicating with the output of the auxiliary combustion chamber and with the intake of said engine and non-return valve means in said pipe means which open when the pressure in the intake is lower than the pressure at the output of the auxiliary combustion chamber for recycling combustion gas from said output to said intake.

12. A power unit according to claim 11 wherein sid recyling pipe means are of sufficient cross-sectional area for circulating the maximum flow rate drawn by the engine without impressing a substantial head loss thereto.

13. A power unit comprising:
an internal combustion engine having variable volume combustion chambers,
a supercharging turbocompressor unit having a compressor and a turbine, the inlet of said turbine being connected to receive the exhaust gas of said engine,
pipe means connecting the outlet of the compressor to the intake of the engine,
bypass conduit means having an inlet and an outlet always connected and open during operation of said turbocompressor unit to flow the air delivered by said compressor and not drawn by the engine to the inlet of said turbine and first throttle means operable therein to produce a pressure loss which is substantially independent of the ratio of the flow rate traversing said bypass conduit means to the air flow delivered by the compressor and which increases with the output pressure of the compressor, an auxiliary combustion chamber connected to receive at least part of the air which circulates along said hypass conduit means and the exhaust gas of said engine and having an output connected to the inlet of said turbine, adjustable air flow second throttling means disposed in said pipe means downstream of the junction of said bypass conduit means with said pipe means, control means having means responsive to the load of the power unit and operatively associated with said second throttling means for limiting the rate of air flow taken by the engine directly from said compressor when said power unit delivers a low amount of power and maintaining said rate of air flow at a value lower than the air flow delivered by the compressor whereby the balance is diverted into said bypass conduit means, and recycling pipe means communicating with the output of the auxiliary combustion chamber and with the intake of said engine downstream of said second throttle means and non-return valve means in said pipe means which open when the pressure in the intake is lower than the pressure at the output of the auxiliary combustion chamber for recycling combustion gas from said output to said intake.

14. A power unit according to claim 13 wherein said recycling pipe means are of sufficient cross-sectional area for circulating the maximum flow rate drawn by the engine without impressing a substantial head loss thereto.

15. A power unit according to claim 13 having means responsive to the pressure in said intake for overriding said control means and for maintaining said second throttle means in fully open condition as long as the pressure in said intake exceeds a predetermined value, and means for sensing the ambient temperature and for adjusting said predetermined value responsive to the variations of said ambient temperature.

16. A power unit according to claim 15 wherein said auxiliary combustion chamber is provided with control means operated in response to the pressure delivered by the compressor for preventing the compressor pressure from decreasing under a predetermined threshold value which is lower than said predetermined value.

17. A power unit according to claim 16 further comprising means for adjusting the coefficient of proportionality between said speed and said cross section as a function of the ambient temperature.

18. A power unit according to claim 17 further comprising a leak path from the intake of the engine to atmosphere, closure means for maintaining said leak path in open condition as long as said engine is at rest whereby hot gas can flow from said auxiliary combustion chamber to flow to atmosphere and sweep said intake prior to cranking of the engine.

* * * * *

UNITED STATES PATENT AND TRADEMARK OFFICE
CERTIFICATE OF CORRECTION

PATENT NO. : 4,078,387
DATED : March 14, 1978
INVENTOR(S) : Jean Melchior, Thierry Andre and Michael de Lambert de Boisjean It is certified that error appears in the above-identified patent and that said Letters Patent are hereby corrected as shown below:

Column 4, line 4 — after "2,179,310" insert -- (U.S. Patent No. 3,988,894) --
Column 4, line 12 — after "valve" cancel -- is --
Column 5, line 20 — insert a close parenthesis symbol " ) " after "12"

Signed and Sealed this

Fifth Day of September 1978

[SEAL]

Attest:

RUTH C. MASON
Attesting Officer

DONALD W. BANNER
Commissioner of Patents and Trademarks